United States Patent
Ahmed et al.

(10) Patent No.: US 11,805,084 B2
(45) Date of Patent: *Oct. 31, 2023

(54) BIDIRECTIONAL BRIDGE FOR WEB VIEW

(71) Applicant: Snap Inc., Santa Monica, CA (US)

(72) Inventors: Muzammil Ahmed, Los Angeles, CA (US); John Jensen, Santa Monica, CA (US); Michel Khristo, Santa Monica, CA (US); Sivakumar Loganathan, San Francisco, CA (US); Patrick Mandia, Venice, CA (US); Jun Xu, Marina del Rey, CA (US); Austin Yeakel, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,054

(22) Filed: Dec. 30, 2022

(65) Prior Publication Data

US 2023/0138147 A1 May 4, 2023

Related U.S. Application Data

(63) Continuation of application No. 17/249,191, filed on Feb. 23, 2021, now Pat. No. 11,575,626.

(Continued)

(51) Int. Cl.
*H04L 51/046* (2022.01)
*H04L 67/025* (2022.01)
(Continued)

(52) U.S. Cl.
CPC .......... *H04L 51/046* (2013.01); *H04L 67/025* (2013.01); *H04L 67/34* (2013.01); *H04L 67/75* (2022.05)

(58) Field of Classification Search
None
See application file for complete search history.

(56) References Cited

U.S. PATENT DOCUMENTS

| 8,887,178 B1 * | 11/2014 | Browne | G06F 9/541 |
| | | | 719/319 |
| 8,996,625 B1 * | 3/2015 | Singleton | H04L 9/40 |
| | | | 707/771 |

(Continued)

FOREIGN PATENT DOCUMENTS

| CN | 115698947 A | 2/2023 |
| WO | WO-2021252255 A1 | 12/2021 |

OTHER PUBLICATIONS

"U.S. Appl. No. 17/249,191, Non Final Office Action dated May 6, 2022", 15 pgs.

(Continued)

*Primary Examiner* — Backhean Tiv
(74) *Attorney, Agent, or Firm* — Schwegman Lundberg & Woessner, P.A.

(57) ABSTRACT

A bidirectional bridge for web view is a technical solution to an engineering challenge associated with presenting external content in a web view. A bidirectional bridge for web view facilitates bidirectional communication between the web view included in the messaging client and the messaging client itself. In response to a user action requesting a web page to be loaded in the web view, the bidirectional bridge initiates a request to messaging client to retrieve external content, receives the requested external content from the messaging client, and displays an image representing the external content in the web view as part of the web page.

20 Claims, 8 Drawing Sheets

Related U.S. Application Data

(60) Provisional application No. 62/705,093, filed on Jun. 10, 2020.

(51) Int. Cl.
*H04L 67/00* (2022.01)
*H04L 67/75* (2022.01)

(56) References Cited

U.S. PATENT DOCUMENTS

| | | | | |
|---|---|---|---|---|
| 9,106,602 | B1* | 8/2015 | Miranda | H04L 51/52 |
| 9,521,102 | B2* | 12/2016 | Shmarovoz | H04L 67/01 |
| 10,057,636 | B1* | 8/2018 | Nijim | H04N 21/4325 |
| 10,212,117 | B2* | 2/2019 | Ramalingam | H04L 51/42 |
| 10,411,729 | B2* | 9/2019 | Miller | H04L 49/35 |
| 10,554,596 | B1* | 2/2020 | Fish | H04L 51/046 |
| 11,057,321 | B1* | 7/2021 | Hao | H04L 51/046 |
| 11,228,871 | B2* | 1/2022 | Klym | H04L 67/568 |
| 11,575,626 | B2* | 2/2023 | Ahmed | H04L 67/75 |
| 2003/0197719 | A1* | 10/2003 | Lincke | H04L 69/04 |
| | | | | 707/E17.116 |
| 2008/0195714 | A1* | 8/2008 | Viidu | H04L 51/224 |
| | | | | 709/206 |
| 2009/0313363 | A1* | 12/2009 | Parsons | H04L 67/34 |
| | | | | 709/223 |
| 2011/0138059 | A1* | 6/2011 | Schleifer | G06F 9/541 |
| | | | | 709/227 |
| 2012/0180022 | A1* | 7/2012 | Hopkins | G06F 8/30 |
| | | | | 717/100 |
| 2013/0239104 | A1* | 9/2013 | Savant | G06F 21/121 |
| | | | | 717/174 |
| 2014/0149308 | A1* | 5/2014 | Ming | G06Q 10/0833 |
| | | | | 705/333 |
| 2014/0244738 | A1* | 8/2014 | Rydenhag | H04L 67/14 |
| | | | | 709/204 |
| 2014/0372403 | A1* | 12/2014 | Liu | H04L 51/046 |
| | | | | 707/706 |
| 2015/0227968 | A1* | 8/2015 | Murphy, Jr. | G06Q 30/0276 |
| | | | | 705/14.49 |
| 2015/0269611 | A1* | 9/2015 | Heffernan | H04L 51/08 |
| | | | | 705/14.45 |
| 2015/0278856 | A1* | 10/2015 | Khoo | H04L 51/046 |
| | | | | 705/14.49 |
| 2016/0042404 | A1* | 2/2016 | Joshi | H04L 51/063 |
| | | | | 705/14.55 |
| 2016/0105518 | A1* | 4/2016 | Rosenshine | H04L 67/1044 |
| | | | | 709/206 |
| 2016/0156574 | A1* | 6/2016 | Hum | H04L 51/02 |
| | | | | 715/752 |
| 2016/0359773 | A1* | 12/2016 | Shi | H04L 51/04 |
| 2017/0060823 | A1* | 3/2017 | Zheng | G06F 3/0482 |
| 2017/0244652 | A1* | 8/2017 | Clarke | H04L 51/18 |
| 2018/0054498 | A1* | 2/2018 | Toksoz | H04L 67/02 |
| 2018/0097755 | A1* | 4/2018 | Mody | H04L 51/046 |
| 2018/0107718 | A1* | 4/2018 | Federspiel | G06F 16/252 |
| 2018/0246983 | A1* | 8/2018 | Rathod | G06F 16/9566 |
| 2018/0341920 | A1* | 11/2018 | Li | H04L 51/046 |
| 2019/0036850 | A1* | 1/2019 | Kushwaha | H04L 51/043 |
| 2019/0087691 | A1* | 3/2019 | Jelveh | G06N 3/084 |
| 2019/0097964 | A1* | 3/2019 | Martinazzi | H04L 51/52 |
| 2019/0180321 | A1* | 6/2019 | Shen | H04L 67/02 |
| 2019/0394147 | A1* | 12/2019 | Rodriguez | H04L 51/046 |
| 2021/0224009 | A1* | 7/2021 | Kikuchi | G06F 3/1205 |
| 2021/0337166 | A1* | 10/2021 | John | G06Q 50/01 |
| 2021/0392097 | A1* | 12/2021 | Ahmed | H04L 67/75 |
| 2021/0392204 | A1* | 12/2021 | Charlton | H04W 4/12 |
| 2022/0148276 | A1* | 5/2022 | Golobokov | H04L 51/04 |
| 2022/0292794 | A1* | 9/2022 | Golobokov | H04L 51/04 |

OTHER PUBLICATIONS

"U.S. Appl. No. 17/249,191, Notice of Allowance dated Sep. 30, 2022", 11 pgs.

"International Application Serial No. PCT/US2021/035615, International Preliminary Report on Patentability dated Dec. 22, 2022", 6 pgs.

"International Application Serial No. PCT/US2021/035615, International Search Report dated Sep. 24, 2021", 4 pgs.

"International Application Serial No. PCT/US2021/035615, Written Opinion dated Sep. 24, 2021", 4 pgs.

"Response filed Sep. 6, 2022 to U.S. Appl. No. 17/249,191, Non Final Office Action dated May 6, 2022".

U.S. Appl. No. 17/249,191, filed Feb. 23, 2021, Bidirectional Bridge For Web View.

* cited by examiner

BIDIRECTIONAL BRIDGE FOR WEB VIEW

CLAIM OF PRIORITY

This application is a continuation of U.S. patent application Ser. No. 17/249,191, filed on Feb. 23, 2021, which claims the benefit of priority to U.S. Provisional Application Ser. No. 62/705,093, filed on Jun. 10, 2020, each of which are incorporated herein by reference in their entireties.

TECHNICAL FIELD

The present disclosure relates generally to facilitating interactions between a messaging client and third-party resources.

BACKGROUND

The popularity of computer-implemented programs that permit users to access and interact with content and other users online continues to grow. Various computer-implemented applications exist that permit users to share content with other users through messaging clients. Some of such computer-implemented applications, termed apps, are installed directly onto a mobile device such as a phone, a tablet, or a wearable device. An app may have a backend service provided on a server computer system to perform operations that may require resources greater than is reasonable to perform at a client device (e.g., storing large amounts of data or performing computationally expensive processing). For example, a messaging client and the associated messaging server system may be configured to permit online users to share content. A messaging client may be configured to contain an embedded web browser, termed a web view, which is a view that displays web pages from within the messaging client. A web view, which allows embedding web pages in the specific environment of an app, can be used for web pages that do not include third party links that trigger HTTP (Hypertext Transfer Protocol) requests, in order to avoid or minimize disruption to the user's experience within the app.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

An example messaging system, which is described in detail further below, permits users to interact online with other users, as well as share and discover content. Various functionality of the messaging system can be accessed via an app, such as a messaging client provided by the messaging system, which is designed to run on a mobile device such as a phone, a tablet, or a wearable device. The messaging client that includes an embedded browser, called a web view, allows third party publishers to provide their web content to the users of the messaging client. As mentioned above, it may be undesirable to use external inks that trigger HTTP requests in a web page rendered by a web view, because activating an external link may disrupt the user's experience within the messaging client by launching another, independent app or a mobile web browser. Including into a web page a link that triggers an HTTP request is a means of displaying within the web page external content (content that is external with respect to the web page provider, such as an advertisement).

The technical problem of displaying external content in a web page presented in a web view is addressed by including, into the web page, a bidirectional bridge that facilitates bidirectional communication between the web view included in the messaging client and the messaging client itself. The bidirectional bridge facilitates bidirectional communication between the web view and an external content component of the messaging client provided at a client device. The external content component of the messaging client is configured to retrieve external content, such as, for example, advertisements, from a third party server system or from a server that is part of the messaging system. The external content component of the messaging client retrieves external content in response to a request for external content or, for example, in response to an event interpreted as a request for external content.

An example process of engaging a bidirectional bridge that results in presentation of external content as part of a web page displayed in a web view of the messaging client is described below. The process commences in response to a user action (e.g., a tap or a swipe or any other predetermined gesture) requesting a web page to be loaded in the web view.

Figure 7:
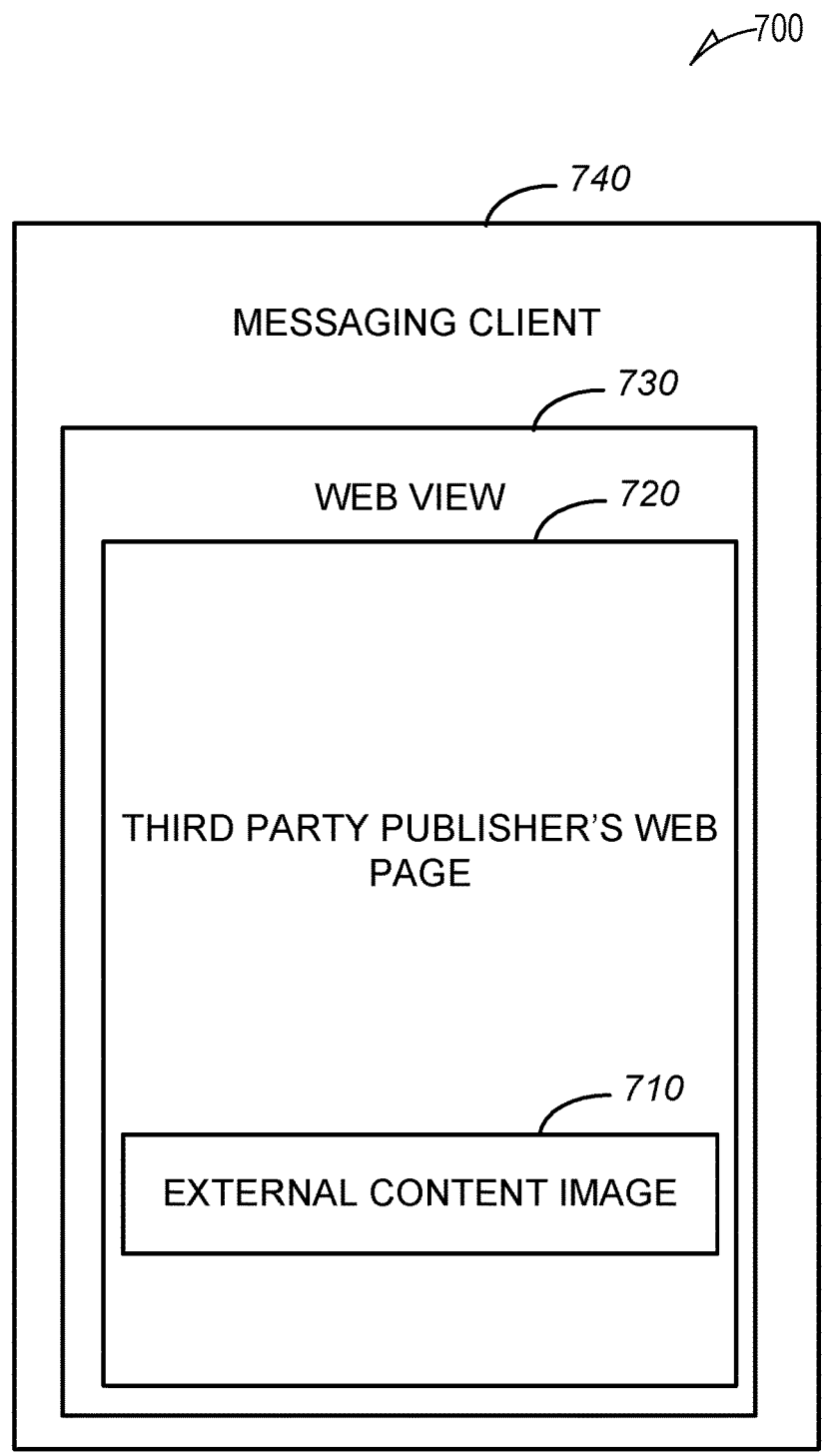
FIG. 7 is an example diagram illustrating display of external content in a web view included in a messaging client, which results from engaging a bidirectional bridge for web view.

Provided the web page includes a placeholder for external content (termed a slot), the bidirectional bridge initiates a request, directed to the external content component of the messaging client, to retrieve external content. The external content component, after determining that the external content is available, obtains the external content from an external content server (or from cache if the requested external content has been previously cached). The web view receives the external content obtained by the external content component, places an image or a video representing the external content into the placeholder for external content in the document object model (DOM) representing the web page, and includes in the DOM an event handler for the image representing the external content. An image or a video representing the external content, when presented as part of the web page, may be referred to merely as external content. Furthermore, it will be understood that, while this description may refer to an image representing the external content, the external content can also be represented by a video. An event handler for the image representing the external content can be configured to cause a certain operation to be performed in the messaging client in response to a certain event. For example, an event handler may be configured to launch a digital distribution functionality, in the messaging client, in response to a detecting a tap on the image or video representing the external content. An example diagram illustrating display of external content in a web view included in the messaging client, which results from engaging a bidirectional bridge, is shown in FIG. 7, which is described further below.

When a user taps on or otherwise engages the image representing the external content, the bidirectional bridge notifies the external content component to activate the external content. For example, where the image representing the external content is associated with an install option for a further app, when a user taps on or otherwise engages the image representing an install option for a further app, the bidirectional bridge causes launching, in the messaging client, an associated digital distribution app that can be used to install the further app at the client device. The bidirectional bridge is also configured to monitor and log impressions of the external content displayed in the web view of the messaging client and, also monitor and log user interactions with the external content displayed in the web view of the messaging client.

In some examples, a bidirectional bridge is constructed utilizing a scripting language, such as, for example, JavaScript™, which can be automatically injected into a web page that is designated for presentation in a web view included in the messaging client using a software developer kit (SDK) provided by the messaging system. SDKs are provided in the messaging system by a developer tools server, which is described below with reference to FIG. 1. A web page that includes a bidirectional bridge and, as a result, can display dynamic external content in a web view within the messaging client is referred to, for the purposes of this description, as an external content enabled web page.

Networked Computing Environment

Figure 1:
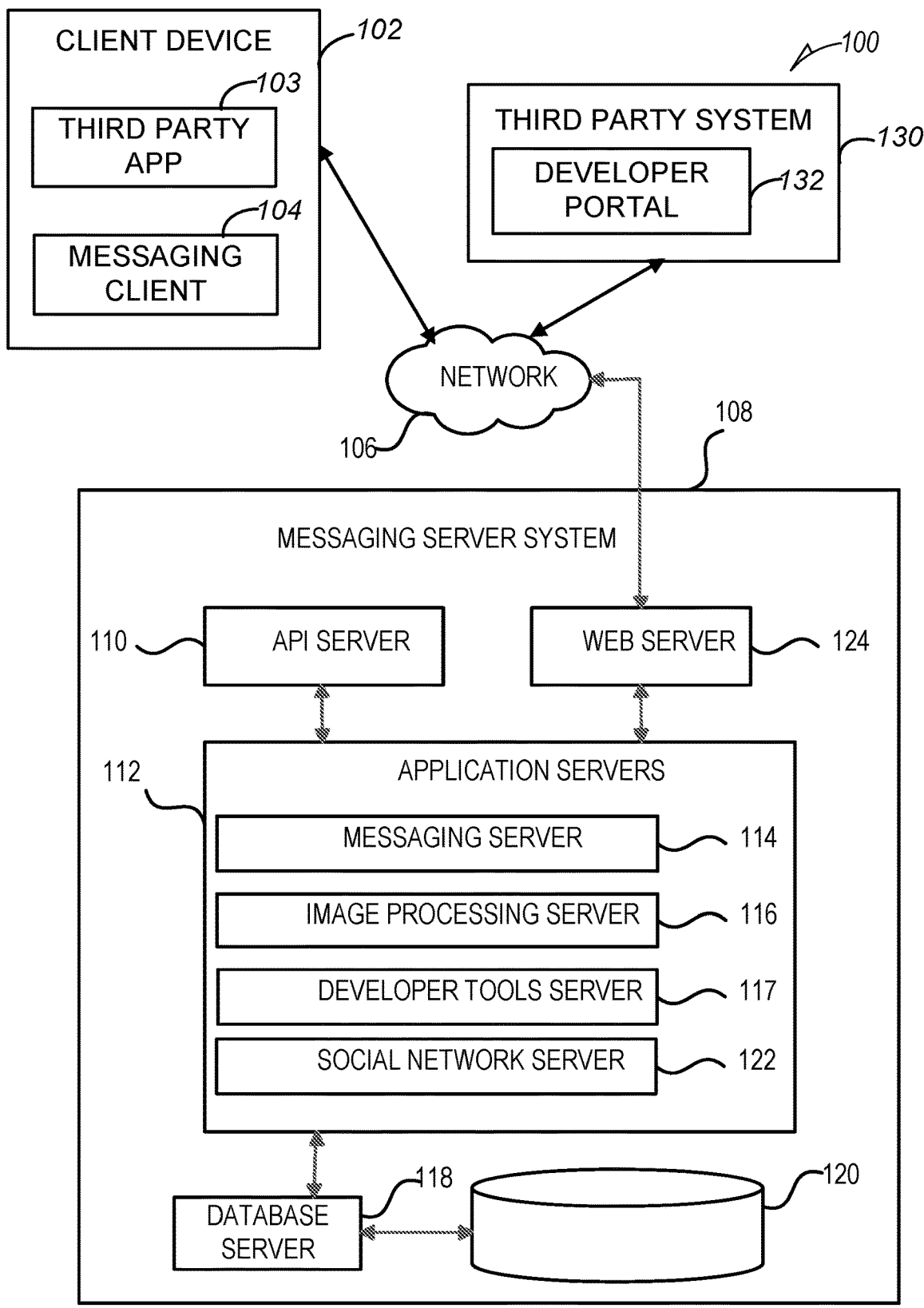
FIG. 1 is a diagrammatic representation of a networked environment in which a developer tools system may be deployed, in accordance with some examples.

FIG. 1 is a block diagram showing an example messaging server system 100 for exchanging data (e.g., messages and associated content) over a network. The messaging server system 100 includes multiple instances of a client device 102, each of which hosts a number of applications, including a messaging client 104 and a third party app 103. The third party app 103 is configured to permit users to access functionality provided by a third party system 130. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data). A messaging client 104 includes an embedded browser, a web view, which allows third party publishers to provide their web pages to the users from within a messaging client 104. A messaging client 104 also includes an external content component, which is configured to retrieve external content, such as, for example, advertisements, from a third party server system or from a server that is part of the messaging system. The external content component of a messaging client 104 retrieves external content in response to a request for external content or, for example, in response to an event interpreted as a request for external content.

The messaging server system 108 provides server-side functionality via the network 106 to a particular messaging client 104. While certain functions of the messaging server system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging server system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120. A web server 124 is coupled to the application servers 112 and provides web-based interfaces to the application servers 112. To this end, the web server 124 processes incoming network requests over the Hypertext Transfer Protocol (HTTP) and several other related protocols. The database 120 stores data associated with messages processed by the application servers 112, such as, e.g., profile data about a particular entity. Where the entity is an individual, the profile data includes, for example, a user name, notification and privacy settings, as well as self-reported age of the user and records related to changes made by the user to their profile data.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, opening an application event (e.g., relating to the messaging client 104), as well as various functions supported by developer tools provided by the messaging server system 108 for use by third party computer systems.

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. The image processing server 116 that is dedicated to performing various image processing operations, typically with respect to images or video within the payload of a message sent from or received at the messaging server 114. The social network server 122 supports various social networking functions and services and makes these functions and services available to the messaging server 114.

Also shown in FIG. 1 is a developer tools server 117. The developer tools server 117 maintains one or more software developer kits (SDKs) that permit users to integrate some of the features provided with the messaging server system across their app (an app developed by the user). In one embodiment, an SDK maintained by the developer tools server 117 permits third-party publishers to designate web pages that are to be available for displaying in the web view of the messaging client 104. The SDK maintained by the developer tools server 117 is configured to inject, into the web page, the bidirectional bridge that facilitates bidirectional communication between the web view of the messaging client 104 and the messaging client 104, and, also, web page components designating one or more slots in the web page for external content. The bidirectional bridge is configured to determine whether one or more slots for external content is present in the web page, and is configured to cause interaction between the web view and the messaging client 104 that can result in requesting, obtaining, and receiving external content and displaying it in the web view as part of the web page. The messaging client 104 is configured to detect a request via the bidirectional bridge for external content from the web view, obtain external content, and provide the obtained external content, via the bidirectional bridge, to the web view for presentation in the web view as part of the web page.

The functionality provided by the developer tools server 117 can be accessed from third party computer systems via a developer portal, which may be accessed via a web browser. A developer portal that provides third party computer systems (e.g., the third party system 130) access to the functionality provided by the developer tools server 117, in some examples, can be downloaded to a third party computer system, in which case it may not require the use of a web browser. The third party system 130 is shown to include a developer portal 132.

System Architecture

Figure 2:
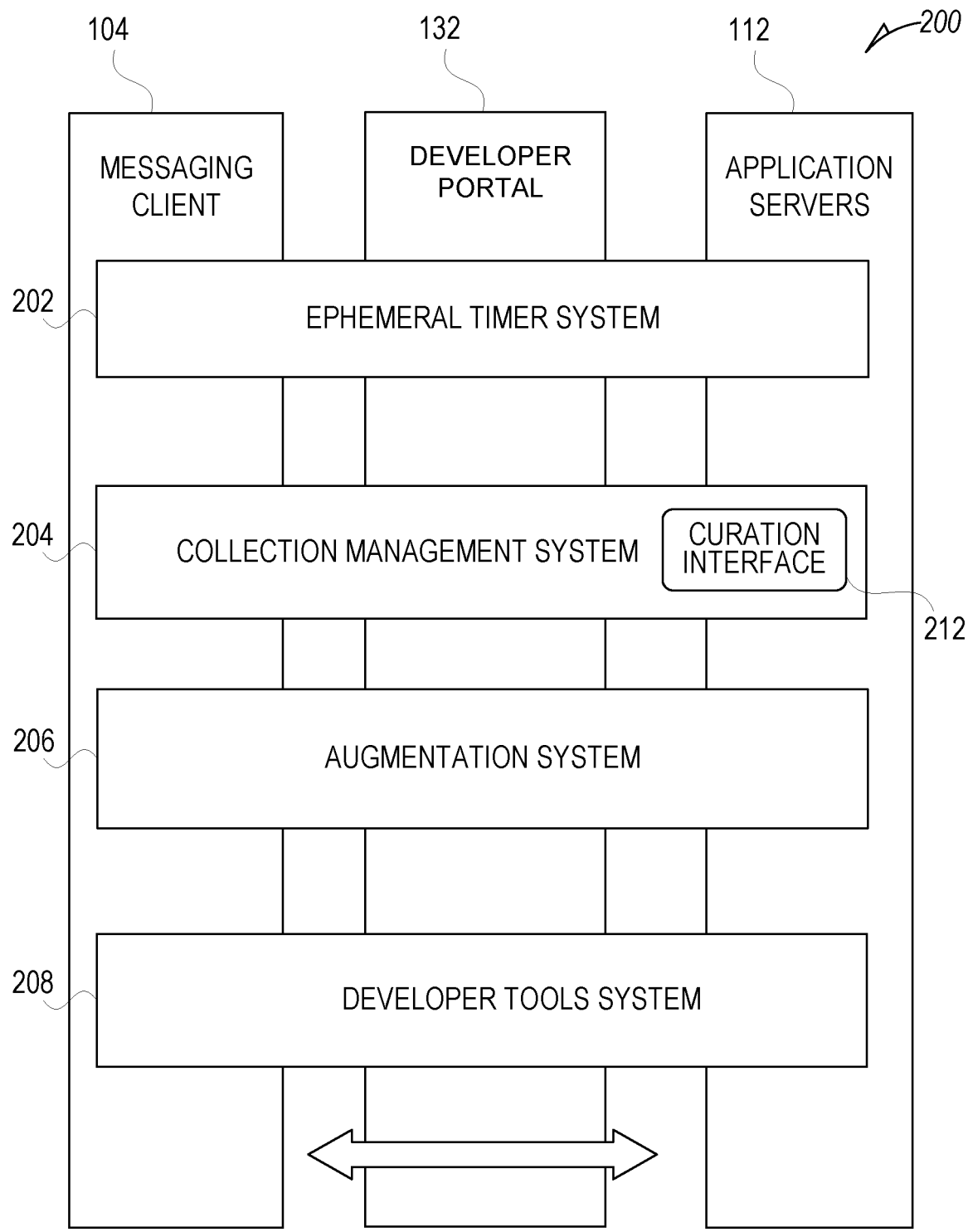
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104, the developer portal 132, and the application servers 112. The messaging system 100 embodies a number of subsystems, which are supported on the client-side by the messaging client 104 and/or the developer portal 132, and on the sever-side by the application servers 112. These subsystems include, for example, an ephemeral timer system 202, a collection management system 204, and an augmentation system 206.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. In a further example, a collection may include third party web pages that include a bidirectional bridge configured to facilitate interaction between the web view and the messaging client. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the messaging system 100. The media overlays may be stored in the database 120 and accessed through the database server 118.

In some examples, the augmentation system 206 is configured to provide access to AR components that can be implemented using a programming language suitable for app development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some embodiments, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a client device and then displayed on a screen of the client device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture, which may be two dimensional or three dimensional, at the tracked position. In still further embodiments, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement.

The developer tools system 208 provides users with access to AR components of a messaging system directly from a third party resource. The developer tools system 208 is also configured to permit a third-party publisher to designate web pages that are to be available for displaying in the web view of the messaging client 104.

Data Architecture

Figure 3:
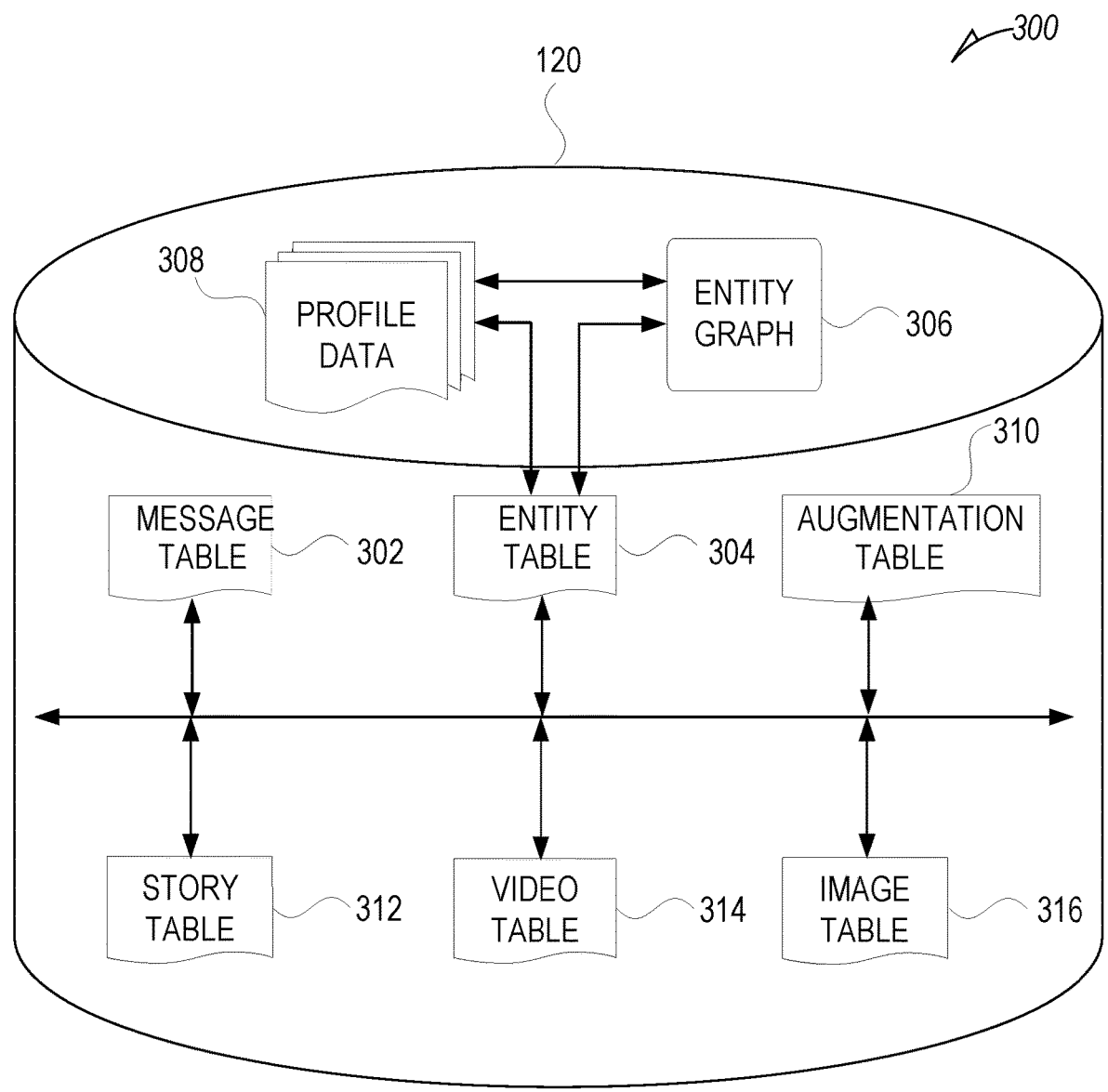
FIG. 3 is a diagrammatic representation of a data structure as maintained in a database, in accordance with some examples.

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. The payload of a message may include content generated from a web page that is external content enabled. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example. With reference to the functionality provided by the AR component, the entity graph 306 stores information that can be used, in cases where the AR component is configured to permit using a portrait image of a user other than that of the user controlling the associated client device for modifying the target media content object, to determine a further profile that is connected to the profile representing the user controlling the associated client device. As mentioned above, the portrait image of a user may be stored in a user profile representing the user in the messaging system.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

The database 120 also stores augmentation data in an augmentation table 310. The augmentation data is associated with and applied to videos (for which data is stored in a video table 314) and images (for which data is stored in an image table 316). In some examples, the augmentation data is used by various AR components, including the AR component. An example of augmentation data is a target media content object, which may be associated with an AR component and used to generate an AR experience for a user, as described above.

Another example of augmentation data is augmented reality (AR) tools that can be used in AR components to effectuate image transformations. Image transformations include real-time modifications, which modify an image (e.g., a video frame) as it is captured using a digital image sensor of a client device 102. The modified image is displayed on a screen of the client device 102 with the modifications. AR tools may also be used to apply modifications to stored content, such as video clips or still images stored in a gallery. In a client device 102 with access to multiple AR tools, a user can apply different AR tools (e.g., by engaging different AR components configured to utilize different AR tools) to a single video clip to see how the different AR tools would modify the same video clip. For example, multiple AR tools that apply different pseudorandom movement models can be applied to the same captured content by selecting different AR tools for the same captured content. Similarly, real-time video capture may be used with an illustrated modification to show how video images currently being captured by a digital image sensor of a camera provided with a client device 102 would modify the captured data. Such data may simply be displayed on the screen and not stored in memory, or the content captured by digital image sensor may be recorded and stored in memory with or without the modifications (or both). A messaging client 104 can be configured to include a preview feature that can show how modifications produced by different AR tools will look, within different windows in a display at the same time. This can, for example, permit a user to view multiple windows with different pseudorandom animations presented on a display at the same time.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story. In some examples, the story table 312 stores one or more images or videos that were created using the AR component.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
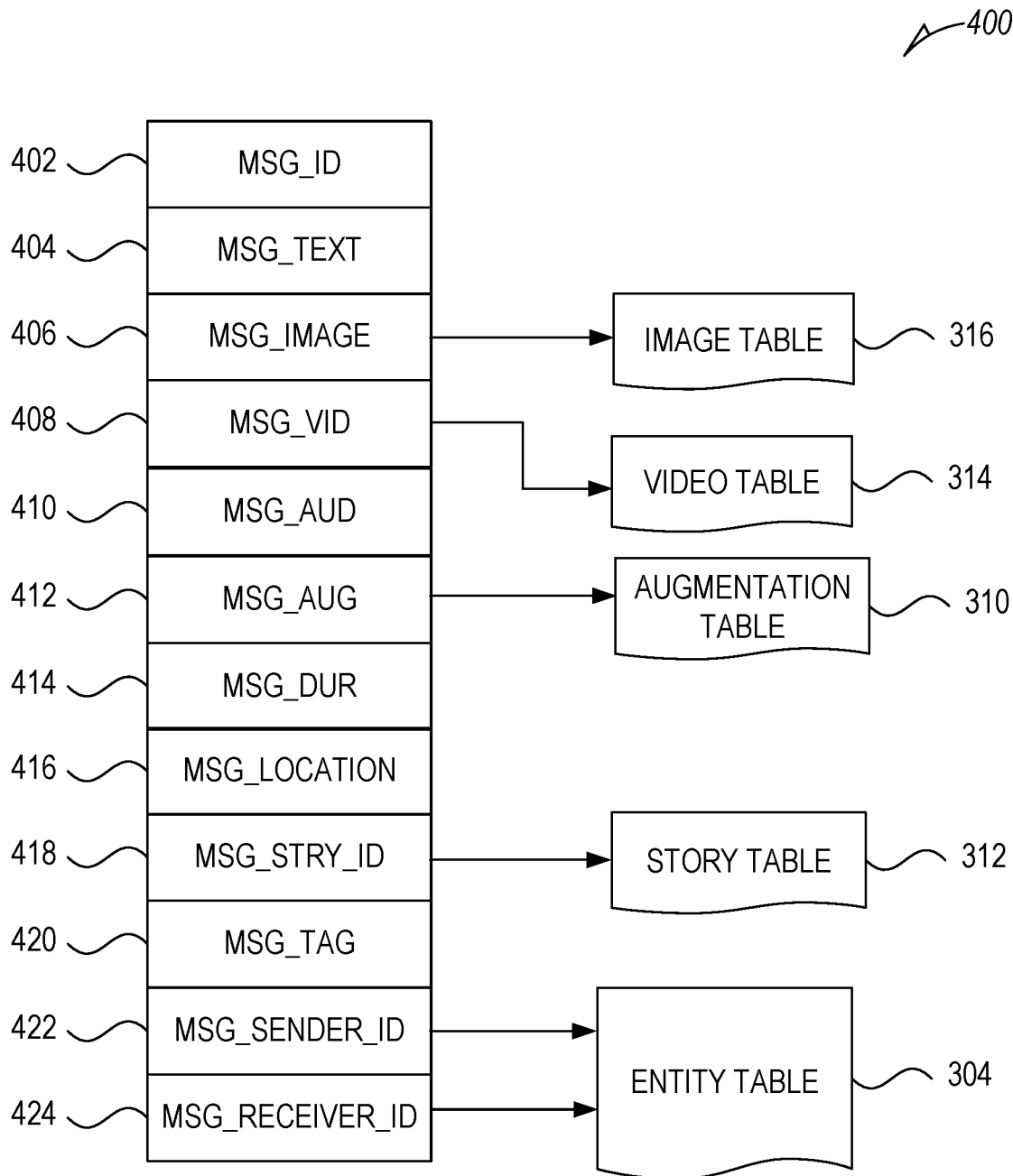
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. The content of a message 400, in some examples, includes an image or a video that was created using the AR component. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316. Image data for a sent or received message 400, in some examples, is an image of a web page that is external content enabled.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
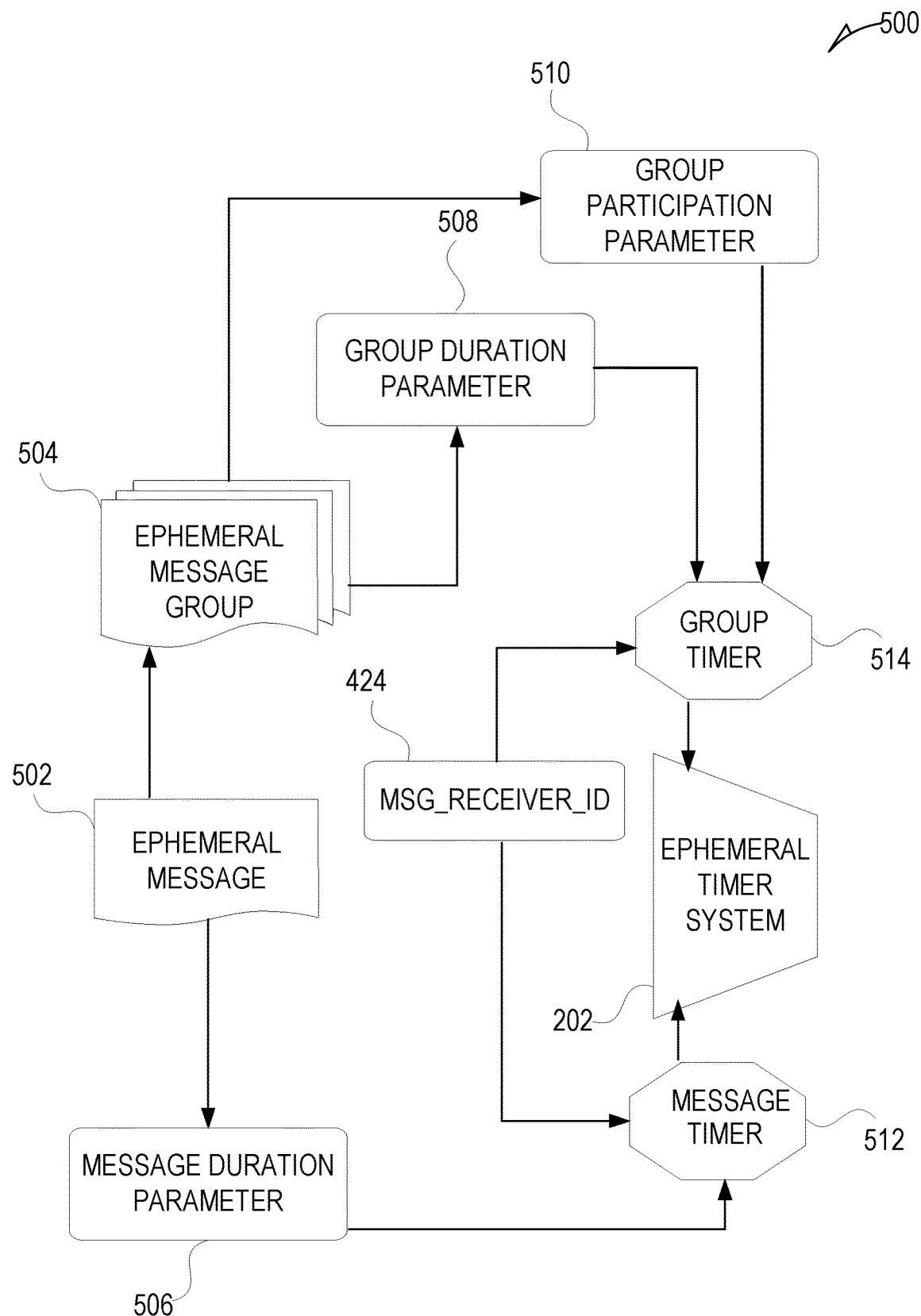
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral). The content of an ephemeral message 502, in some examples, includes an image of a web page that is external content enabled.

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Flowchart

Figure 6:
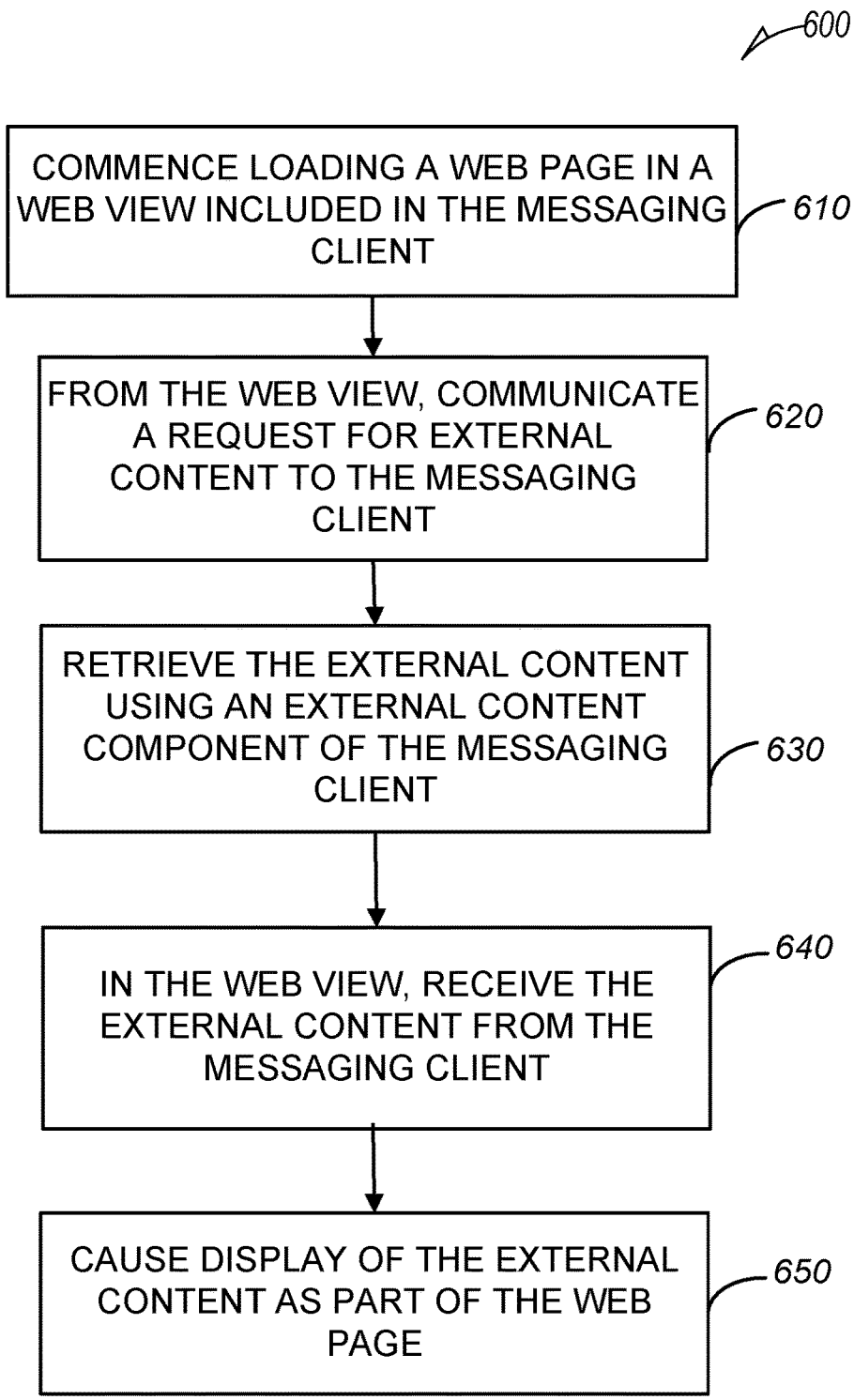
FIG. 6 is a flowchart illustrating the use of a bidirectional bridge for web view, in accordance with some examples.

FIG. 6 is a flowchart of a method 300 that uses a bidirectional bridge pattern to render external content (e.g., ads or other external data) within a web view in the messaging client 104. The method 600 may be performed by processing logic that may comprise hardware (e.g., dedicated logic, programmable logic, microcode, etc.), software, or a combination of both. In one example embodiment, the processing logic resides at the messaging system 100 of FIG. 1.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

The method 600 commences with operation 610, with loading of a web page in a web view of a messaging client. The web page being loaded is an external content enabled web page. As stated above, an external content enabled web page is a web page that includes a bidirectional bridge configured to facilitate interaction between the web view and the messaging client.

At operation 620, a request for external content is communicated from the bidirectional bridge included in the web page to an external content component of the messaging client. The external content component is configured to retrieve external content, such as, for example, advertisements, from a third party server system or from a server that is part of the messaging system. The external content component can retrieve the requested external content in response to a request for external content or, for example, in response to an event interpreted as a request for external content, such as, e.g., when a user taps on the image representing the external content. In some examples, the request for the external content to the messaging client is issued subsequent to detecting that the web page includes a placeholder for the external content.

At operation 630, the external content component of the messaging client is used to retrieve the external content. The external content component retrieves the external content via a network communication, from an external content server. In some examples, the requested external context has been previously cached at the client device, the external content component retrieves the requested external context is retrieved from the cache.

At operation 640, the web view receives the retrieved external content from the messaging client via the bidirectional bridge. As explained above, the web view places an image representing the external content into a placeholder for external content in the document object model (DOM) representing the web page, and includes in the DOM an event handler for the image representing the external content. The event handler can be configured to cause a certain operation to be performed in the messaging client in response to a certain event. For example, an event handler may be configured to launch a digital distribution functionality (delivery of digital content by means of downloading), in the messaging client, in response to a detecting a tap on the image representing the external content.

The web view displays on a display of the client device the external content as part of the web page in the web view, at operation 650. The external content displayed as part of the web page is an image representing the external content. An image representing the external content can be referred to as an external content image. An example of the external content is an install option for a further app. When activation of the install option for the further app is detected in the web view, the messaging client loads, in the web view, an app install page that provides instructions for installing the further app. As stated above, the bidirectional bridge is automatically injected into the web page prior to the loading of the web page in the web view of the messaging client.

FIG. 7 is an example diagram 700 illustrating display of external content in a web view included in a messaging client, which results from engaging a bidirectional bridge for web view. The diagram 700 shows an external content image 710 displayed as part of a third party publisher's web page 720, which is presented in a web view 730 in a messaging client 740 installed at a client device. The third party publisher's web page 720 is an external content enabled web page; it includes a bidirectional bridge configured to facilitate interaction between the web view 730 and the messaging client 740.

In one example, the external content image 710 is associated with an install option for a further app. When a user taps on or otherwise engages the external content image 710, the bidirectional bridge causes launching, in the messaging client 740, an associated digital distribution app that can be used to install the further app at the client devise.

Machine Architecture

Figure 8:
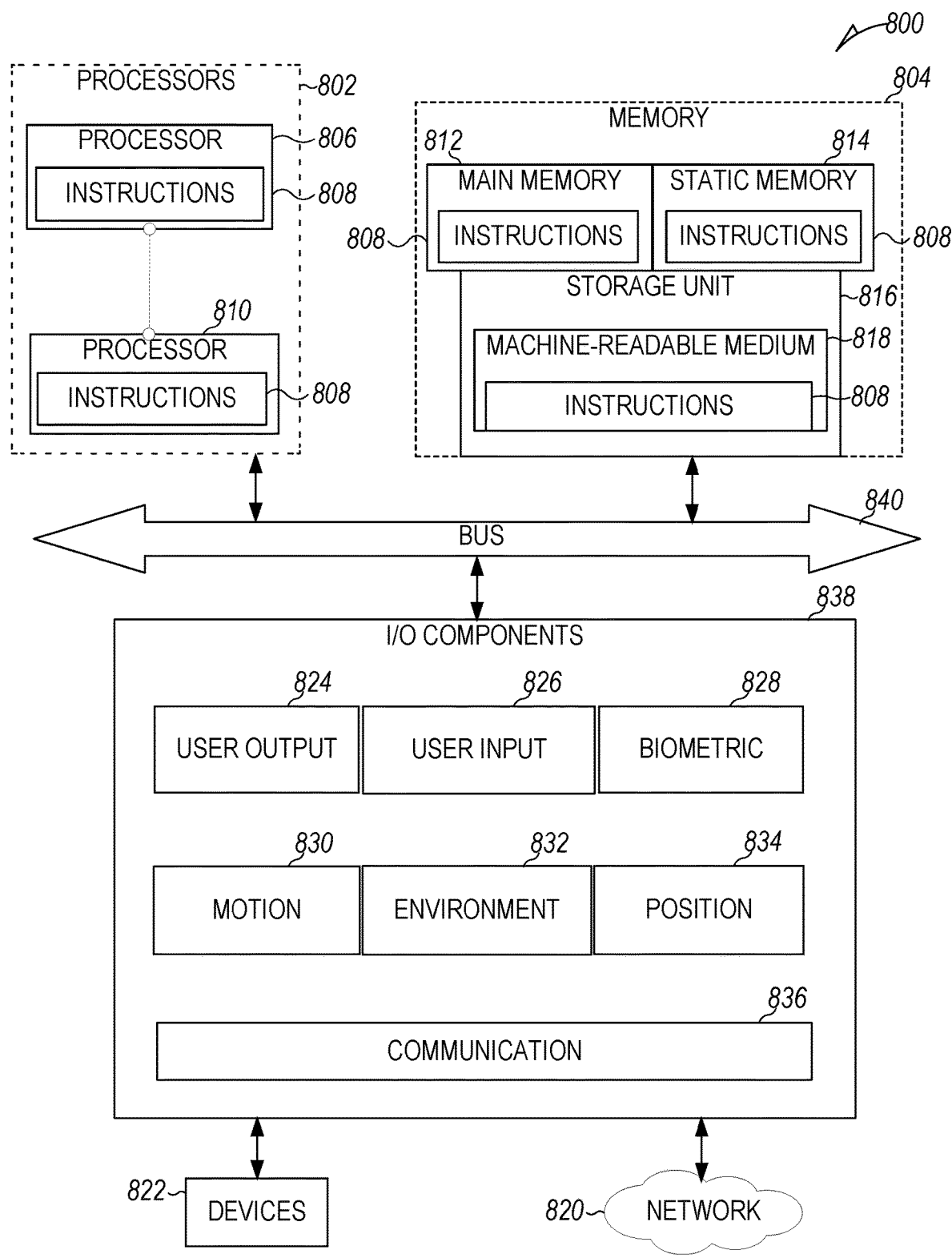
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 808 (e.g., software, a program, an application, an applet, an app, or other executable code) for causing the machine 800 to perform any one or more of the methodologies discussed herein may be executed. For example, the instructions 808 may cause the machine 800 to execute any one or more of the methods described herein. The instructions 808 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines that individually or jointly execute the instructions 808 to perform any one or more of the methodologies discussed herein. The machine 800, for example, may comprise the client device 102 or any one of a number of server devices forming part of the messaging server system 108. In some examples, the machine 800 may also comprise both client and server systems, with certain operations of a particular method or algorithm being performed on the server-side and with certain operations of the particular method or algorithm being performed on the client-side.

The machine 800 may include processors 802, memory 804, and input/output I/O components 838, which may be configured to communicate with each other via a bus 840. In an example, the processors 802 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 806 and a processor 810 that execute the instructions 808. The term "processor" is intended to include multi-core processors that may comprise two or more independent processors (sometimes referred to as "cores") that may execute instructions contemporaneously. Although FIG. 8 shows multiple processors 802, the machine 800 may include a single processor with a single-core, a single processor with multiple cores (e.g., a multi-core processor), multiple processors with a single core, multiple processors with multiples cores, or any combination thereof.

The memory 804 includes a main memory 812, a static memory 814, and a storage unit 816, both accessible to the processors 802 via the bus 840. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the processors 802 (e.g., within the Processor's cache memory), or any suitable combination thereof, during execution thereof by the machine 800.

The I/O components 838 may include a wide variety of components to receive input, provide output, produce output, transmit information, exchange information, capture measurements, and so on. The specific I/O components 838 that are included in a particular machine will depend on the type of machine. For example, portable machines such as mobile phones may include a touch input device or other such input mechanisms, while a headless server machine will likely not include such a touch input device. It will be appreciated that the I/O components 838 may include many other components that are not shown in FIG. 8. In various examples, the I/O components 838 may include user output components 824 and user input components 826. The user output components 824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 838 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 830 include acceleration sensor components (e.g., accelerometer), gravitation sensor components, rotation sensor components (e.g., gyroscope).

The environmental components 832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 838 further include communication components 836 operable to couple the machine 800 to a network 820 or devices 822 via respective coupling or connections. For example, the communication components 836 may include a network interface Component or another suitable device to interface with the network 820. In further examples, the communication components 836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 822 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 812, static memory 814, and memory of the processors 802) and storage unit 816 may store one or more sets of instructions and data structures (e.g., software) embodying or used by any one or more of the methodologies or functions described herein. These instructions (e.g., the instructions 808), when executed by processors 802, cause various operations to implement the disclosed examples.

The instructions 808 may be transmitted or received over the network 820, using a transmission medium, via a network interface device (e.g., a network interface component included in the communication components 836) and using any one of several well-known transfer protocols (e.g., hypertext transfer protocol (HTTP)). Similarly, the instructions 808 may be transmitted or received using a transmission medium via a coupling (e.g., a peer-to-peer coupling) to the devices 822.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 802 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method comprising:
    commencing, by a client application installed at a client device, loading of a web page in a web view of the client application, the web page including a bidirectional bridge configured to facilitate communication between the web view and an external content component of the client application;
    in response to processing the web page for presentation via the web view, generating, by the bidirectional bridge, a request for a web-based advertisement;
    receiving, from the bidirectional bridge, the request for the web-based advertisement at the external content component of the client application;
    retrieving, by the external content component, the web-based advertisement from an external content server;
    receiving, by the web view, the web-based advertisement from the external content component of the client application, and
    causing the web-based advertisement to be presented as part of the web page in a user interface of the client application, on a display of the client device.

2. The computer-implemented method of claim 1, wherein the generating of the request for the web-based advertisement occurs in response to the web view detecting in the web page a placeholder for the web-based advertisement.

3. The computer-implemented method of claim 1, wherein the bidirectional bridge is specified as a script in a source document of the web page.

4. The computer-implemented method of claim 1, wherein the web-based advertisement provides a link via which an application install operation can be invoked.

5. The computer-implemented method of claim 4, further comprising:
    responsive to detecting selection of the link, loading in the web view an application install page providing a link for installing an application to the client device.

6. The computer-implemented method of claim 1, wherein the retrieving of the web-based advertisement from the external content server is via a network communication.

7. The computer-implemented method of claim 1, wherein the web-based advertisement has been previously cached at the client device.

8. The computer-implemented method of claim 1, comprising monitoring, by the bidirectional bridge, events indicative of activation of the web-based advertisement by a user of the client application.

9. The computer-implemented method of claim 1, comprising automatically injecting the bidirectional bridge into the web page prior to the loading of the web page in the web view of the client application, the bidirectional bridge configured to facilitate interaction between the web view and the client application.

10. The computer-implemented method of claim 1, wherein the causing of the display of the web-based advertisement as part of the web page comprises associating an image representing the web-based advertisement with an event handler.

11. A system comprising:
    one or more processors; and
    a non-transitory computer readable storage medium comprising instructions that when executed by the one or more processors cause the one or more processors to perform operations comprising:
    commencing, by a client application installed at a client device, loading of a web page in a web view of the client application, the web page including a bidirectional bridge configured to facilitate communication between the web view and an external content component of the client application;
    in response to processing the web page for presentation via the web view, generating, by the bidirectional bridge, a request for a web-based advertisement;
    receiving, from the bidirectional bridge, the request for the web-based advertisement at the external content component of the client application;
    retrieving, by the external content component, the web-based advertisement from an external content server;
    receiving, by the web view, the web-based advertisement from the external content component of the client application; and
    causing the web-based advertisement to be presented as part of the web page in a user interface of the client application, on a display of the client device.

12. The system of claim 11, wherein the generating of the request for the web-based advertisement occurs in response to the web view detecting in the web page a placeholder for the web-based advertisement.

13. The system of claim 11, wherein the bidirectional bridge is specified as a script in a source document of the web page.

14. The system of claim 11, wherein the web-based advertisement provides a link via which an application install operation can be invoked.

15. The system of claim 14, wherein the operations further comprise:

responsive to detecting selection of the link, loading in the web view an application install page providing a link for installing an application to the client device.

16. The system of claim 11, wherein the retrieving of the web-based advertisement from the external content server is via a network communication.

17. The system of claim 11, wherein the web-based advertisement has been previously cached at the client device.

18. The system of claim 11, wherein the operations further comprise:
    monitoring, by the bidirectional bridge, events indicative of activation of the web-based advertisement by a user of the client application.

19. The system of claim 11, wherein the operations further comprise:
    automatically injecting the bidirectional bridge into the web page prior to the loading of the web page in the web view of the client application, the bidirectional bridge configured to facilitate interaction between the web view and the client application.

20. A machine-readable non-transitory storage medium having instruction data executable by a machine to cause the machine to perform operations comprising:
    commencing, by a client application installed at a client device, loading of a web page in a web view of the client application, the web page including a bidirectional bridge configured to facilitate communication between the web view and an external content component of the client application;

in response to processing the web page for presentation via the web view, generating, by the bidirectional bridge, a request for a web-based advertisement;

receiving, from the bidirectional bridge, the request for the web-based advertisement at the external content component of the client application, retrieving, by the external content component, the web-based advertisement from an external content server;

receiving, by the web view, the web-based advertisement from the external content component of the client application; and causing the web-based advertisement to be presented as part of the web page in a user interface of the client application, on a display of the client device.

\* \* \* \* \*